United States Patent [19]
Weder

[11] Patent Number: 5,526,933
[45] Date of Patent: Jun. 18, 1996

[54] FLORAL WRAPPING MATERIAL WITH VARYING ADHESION

[75] Inventor: Donald E. Weder, Highland, Ill.

[73] Assignees: The Family Trust U/T/A; Southpac Trust International, Inc., Highland, Ill.

[21] Appl. No.: 441,521

[22] Filed: May 15, 1995

Related U.S. Application Data

[62] Division of Ser. No. 255,629, Jun. 9, 1994, which is a continuation of Ser. No. 922,294, Jul. 30, 1992, Pat. No. 5,335,477, which is a continuation-in-part of Ser. No. 803,318, Dec. 4, 1991, Pat. No. 5,344,016, which is a continuation-in-part of Ser. No. 707,417, May 28, 1991, abandoned, which is a continuation of Ser. No. 502,358, Mar. 29, 1990, abandoned, which is a continuation-in-part of Ser. No. 391,463, Aug. 9, 1989, abandoned, which is a continuation-in-part of Ser. No. 249,761, Sep. 26, 1988, abandoned.

[51] Int. Cl.⁶ .................................................. B65B 11/56
[52] U.S. Cl. ........................ 206/423; 206/460; 206/813; 229/87.01
[58] Field of Search ................................ 47/72; 206/423, 206/445, 460, 495, 451, 449, 813; 229/87.01; 281/2, 5

[56] References Cited

U.S. PATENT DOCUMENTS

| | | |
|---|---|---|
| 557,526 | 3/1896 | Egge . |
| 732,889 | 7/1903 | Paver . |
| 898,273 | 9/1908 | Silger et al. . |
| 1,279,984 | 9/1918 | Carter, Jr. . |
| 1,525,015 | 2/1925 | Weeks . |
| 1,863,216 | 6/1932 | Wordingham . |
| 1,978,631 | 10/1934 | Herrlinger ................................ 91/68 |
| 2,048,123 | 7/1936 | Howard ................................... 229/87 |
| 2,170,147 | 8/1939 | Lane ....................................... 206/56 |
| 2,230,530 | 2/1941 | De Priest ................................... 93/2 |
| 2,278,673 | 4/1942 | Savada et al. ........................... 154/43 |
| 2,371,985 | 3/1945 | Freiberg ................................. 206/46 |
| 2,411,328 | 11/1946 | MacNab ................................... 33/12 |
| 2,510,120 | 6/1950 | Leander ................................ 117/122 |
| 2,529,060 | 11/1950 | Trillich ................................ 117/68.5 |
| 2,540,090 | 2/1951 | Brackney ................................... 93/2 |
| 2,544,075 | 3/1951 | Ernst et al. ............................. 150/49 |
| 2,621,142 | 12/1952 | Wetherell .............................. 154/117 |
| 2,822,287 | 2/1958 | Avery .................................... 117/14 |
| 2,846,060 | 8/1958 | Yount .................................... 206/58 |
| 2,883,262 | 4/1959 | Borin ..................................... 21/56 |
| 3,022,605 | 2/1962 | Reynolds ................................. 47/58 |
| 3,113,712 | 12/1963 | Kindseth ................................ 229/14 |
| 3,121,647 | 2/1964 | Harris et al. .......................... 118/202 |
| 3,130,113 | 4/1964 | Silman .................................. 161/97 |
| 3,148,799 | 9/1964 | Meroney ................................. 220/63 |
| 3,215,330 | 11/1965 | Thomas ................................. 229/14 |
| 3,271,922 | 9/1966 | Wallerstein et al. ....................... 53/3 |
| 3,508,372 | 4/1970 | Wallerstein et al. ....................... 53/3 |
| 3,514,012 | 5/1970 | Martin .................................. 220/63 |
| 3,620,366 | 11/1971 | Parkinson .............................. 206/59 |
| 3,681,105 | 8/1972 | Milutin ................................. 117/15 |
| 3,757,990 | 9/1973 | Buth .................................... 220/63 |
| 3,927,821 | 12/1975 | Dunning ................................ 229/14 |

(List continued on next page.)

FOREIGN PATENT DOCUMENTS 2610604  8/1988  France .

OTHER PUBLICATIONS

"The Simple Solution For Those Peak Volume Periods", Highland Supply Speed Cover Brochure, 1989, 6 pages.
"Speed Sheets and Speed Rolls", Highland Supply Speed Sheets Brochure, 1990, 2 pages.
"A World of Cut Flower and Pot Packaging" Brochure, Klerk's Plastic Products Manufacturing, Inc., Date unknown, 6 pages.

*Primary Examiner*—Jacob K. Ackun
*Attorney, Agent, or Firm*—Dunlap & Codding

[57]  ABSTRACT

A wrapping material for wrapping a floral grouping comprised of a pad of sheets of material. Each sheet of material has adhesive unevenly disposed across the upper surface of the material with the amount of adhesive being greater near one end of the adhesive than near the other end of the adhesive. Methods of wrapping the floral grouping with the wrapping material.

13 Claims, 5 Drawing Sheets

U.S. PATENT DOCUMENTS

| | | | |
|---|---|---|---|
| 4,054,697 | 10/1977 | Reed et al. | 428/40 |
| 4,216,620 | 8/1980 | Weder et al. | 47/72 |
| 4,333,267 | 6/1982 | Witte | 47/84 |
| 4,379,101 | 4/1983 | Smith | 264/40.3 |
| 4,380,564 | 9/1983 | Cancio et al. | 428/167 |
| 4,413,725 | 11/1983 | Bruno et al. | 206/45.33 |
| 4,500,021 | 2/1985 | Bildusas | 383/95 X |
| 4,546,875 | 10/1985 | Zweber | 206/0.82 |
| 4,733,521 | 3/1988 | Weder et al. | 53/580 |
| 4,765,464 | 8/1988 | Ristvedt | 206/0.82 |
| 4,989,396 | 2/1991 | Weder et al. | 206/423 |
| 5,007,229 | 4/1991 | Weder et al. | 53/397 |
| 5,111,638 | 5/1992 | Weder | 53/397 |
| 5,181,364 | 1/1993 | Weder | 53/397 |

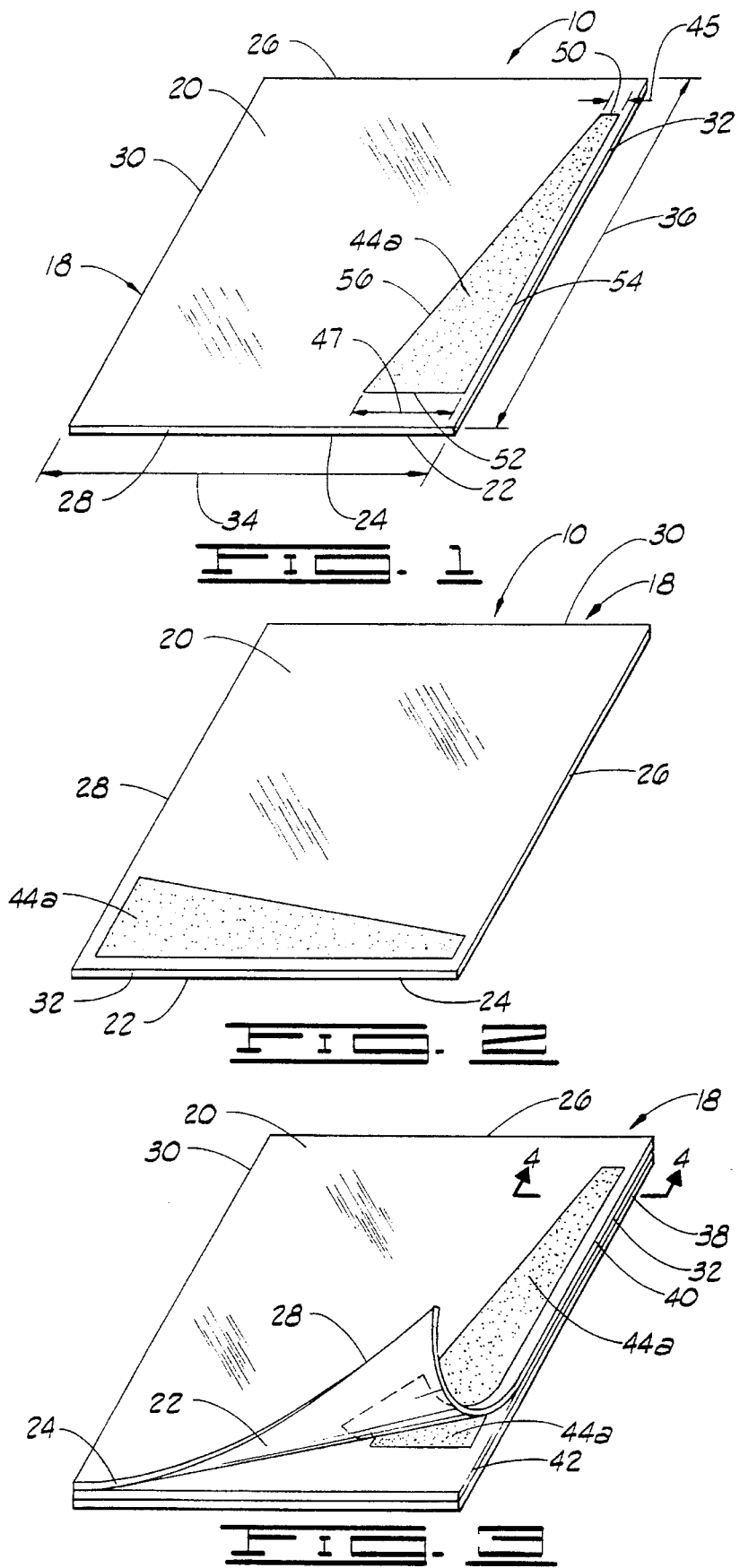

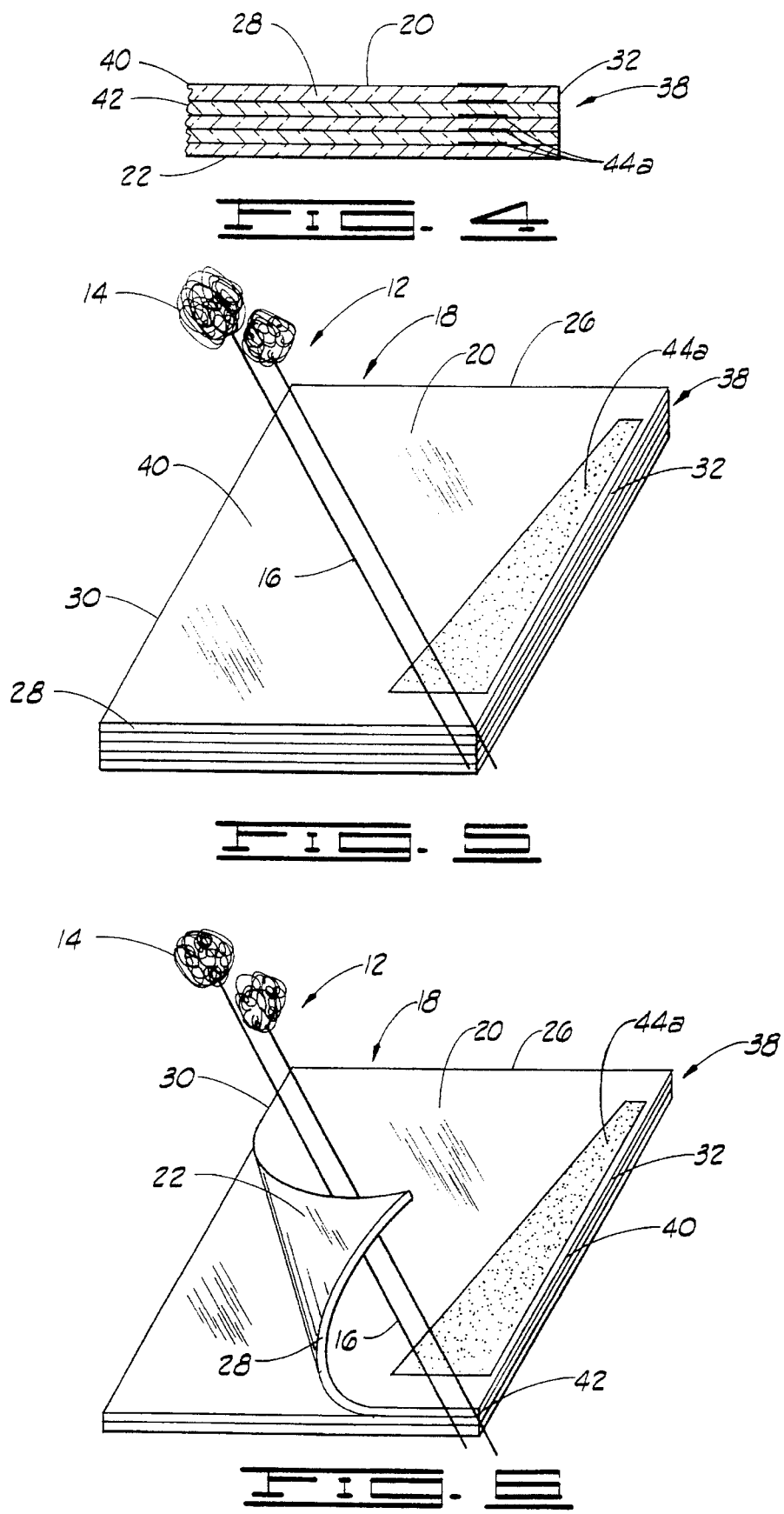

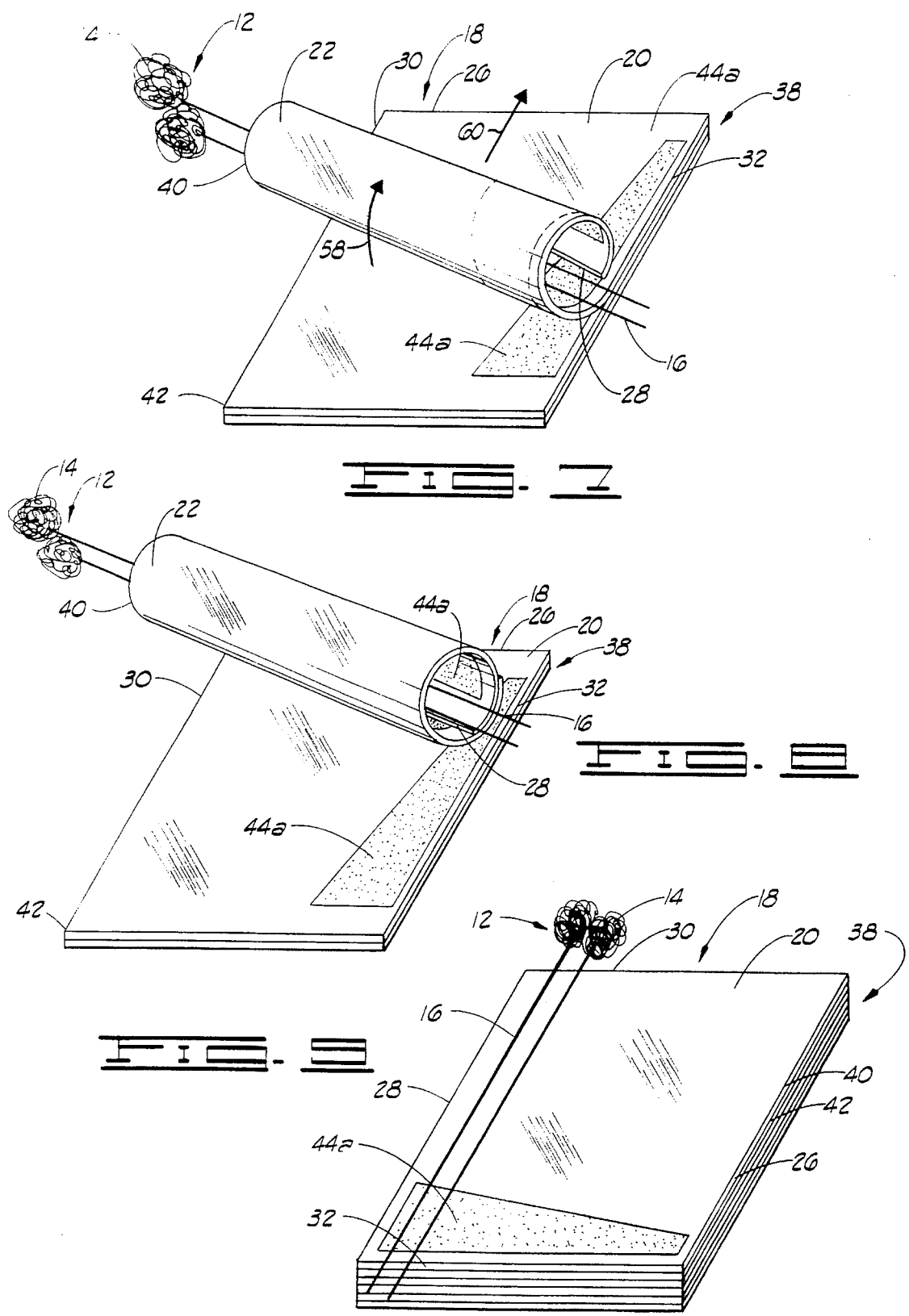

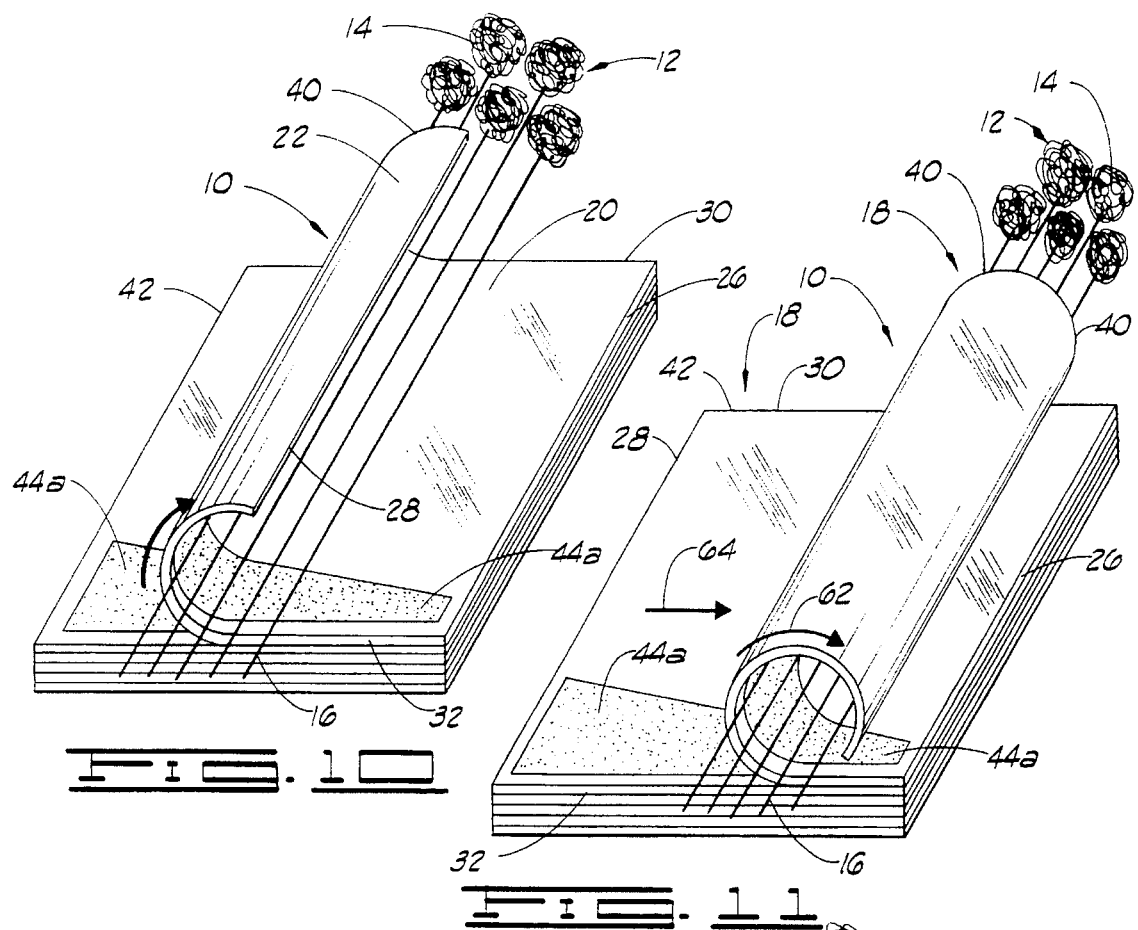
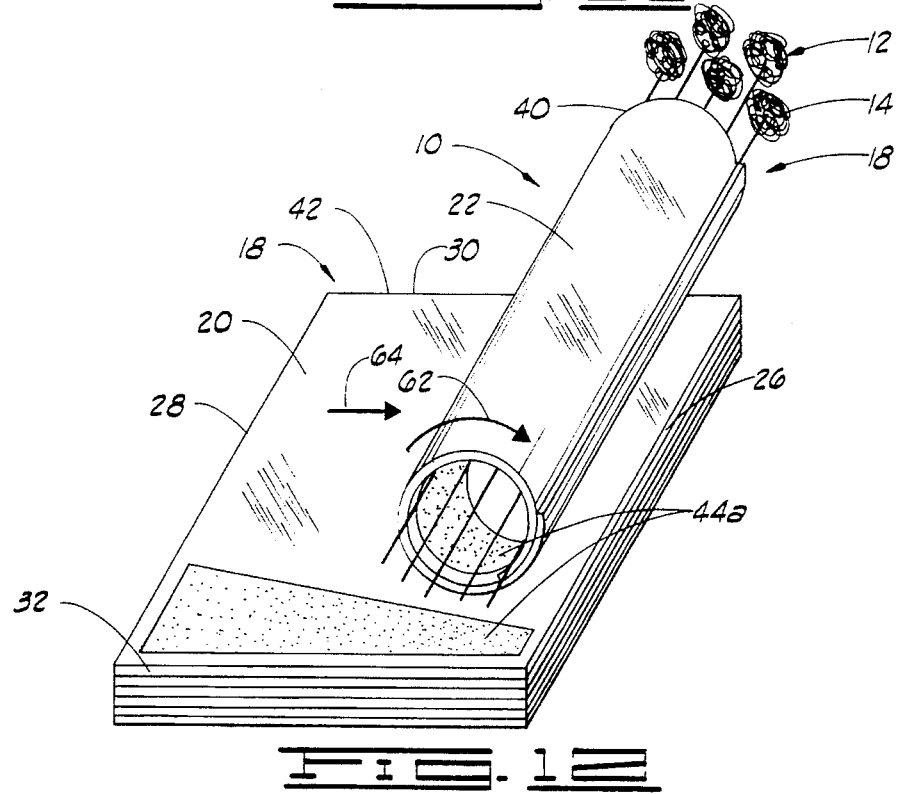

FLORAL WRAPPING MATERIAL WITH VARYING ADHESION

RELATED REFERENCES

Cross Reference to Related Applications

This application is a divisional of U.S. Ser. No. 08/255,629, filed Jun. 9, 1994, entitled "FLORAL GROUPING WRAPPING MATERIAL WITH VARYING ADHESION", which is a continuation of U.S. Ser. No. 07/922,294, filed Jul. 30, 1992, entitled "METHOD OF WRAPPING A FLORAL GROUPING", now U.S. Pat. No. 5,335,477, issued Aug. 9, 1994, which is a continuation-in-part of U.S. Ser. No. 07/803,318, filed Dec. 4, 1991, entitled "WRAPPING MATERIAL FOR WRAPPING A FLORAL GROUPING HAVING STAGGERED STRIPS OF ADHESIVE APPLIED THERETO AND METHOD", now U.S. Pat. No. 5,344,016, issued Sep. 6, 1994, which is a continuation-in-part of U.S. Ser. No. 07/707,417, filed May 28, 1991, entitled "WRAPPING A FLORAL GROUPING WITH SHEETS HAVING ADHESIVE OR COHESIVE MATERIAL APPLIED THERETO", now abandoned, which is a continuation of U.S. Ser. No. 07/502,358, filed Mar. 29, 1990, entitled "WRAPPING A FLORAL GROUPING WITH SHEETS HAVING ADHESIVE OR COHESIVE MATERIAL APPLIED THERETO", now abandoned, which is a continuation-in-part of U.S. Ser. No. 07/391,463, filed Aug. 9, 1989, entitled "ADHESIVE APPLICATOR", now abandoned, which is a continuation-in-part of U.S. Ser. No. 07/249,761, filed Sep. 26, 1988, entitled "METHOD FOR WRAPPING AN OBJECT IN A MATERIAL HAVING PRESSURE SENSITIVE ADHESIVE THEREON", now abandoned.

FIELD OF THE INVENTION

Background of the Invention

The present invention relates generally to wrapping material for wrapping floral groupings and, more particularly, but not by way of limitation, to a wrapping material having an adhesive on at least one surface where the adhesive tack is varied over the surface.

BRIEF DESCRIPTION OF THE DRAWINGS

FIG. 1 is a perspective view of the sheet of material of the present invention, showing the upper surface, with adhesive thereon shown in a variable width strip.

FIG. 2 is a perspective view similar to that of FIG. 1, but showing the sheet of material rotated clockwise 90 degrees.

FIG. 3 is a perspective view of a plurality of sheets of material with each sheet being constructed as shown in FIG. 1 and with the sheets connected together to form a pad. A corner of the top sheet is turned up to show the lower surface of the sheet of material.

FIG. 4 is an enlarged cross-sectional partial view of FIG. 3 taken along the lines of 4—4 of FIG. 3, showing a vertical alignment of strips of adhesive.

FIG. 5 is a perspective view of a plurality of sheets of material with each sheet disposed as shown in FIG. 1 and with the sheets connected together to form a pad of sheets of material, as shown in FIG. 3, a floral grouping being shown disposed on a portion of the top sheet of material in the pad.

FIG. 6 is a perspective view of the pad of sheets of material, shown in FIG. 5, but showing a portion of the top sheet of material wrapped partially about the floral grouping.

FIG. 7 is a perspective view of the pad of sheets of material shown in FIG. 6 with the top sheet of material wrapped generally about the floral grouping just prior to the top sheet of material being disconnected from the pad.

FIG. 8 is a perspective view of the pad of sheets of material shown in FIGS. 5–7, with the floral grouping wrapped with the top sheet of material just after the top sheet of material has been disconnected from the pad.

FIG. 9 is a perspective view of a plurality of sheets of material with each sheet disposed as shown in FIG. 2 and with the sheets connected together to form a pad of sheets of material, a floral grouping being shown disposed on the top sheet.

FIG. 10 is a perspective view of the pad of sheets of material, shown in FIG. 9, but showing a portion of the top sheet wrapped partially about the floral grouping.

FIG. 11 is a perspective view of the pad of sheets of material shown in FIG. 9 with the top sheet wrapped generally about the floral grouping just prior to the top sheet being disconnected from the pad.

FIG. 12 is a perspective view of the pad of sheets of material shown in FIGS. 9–11, with the floral grouping wrapped with the top sheet of material just after the top sheet of material has been disconnected from the pad.

DESCRIPTION OF THE PREFERRED EMBODIMENTS

Figure 13:
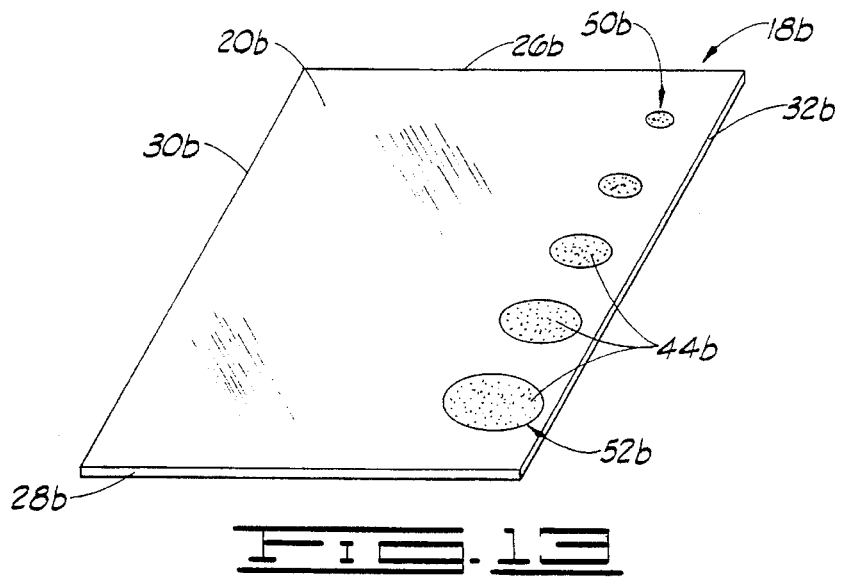
FIG. 13 is a perspective view of a modified sheet of material similar to the sheet of material shown in FIG. 1, except that the adhesive is shown in a series of evenly spaced circle-shaped spots of variable size.

Referring to FIG. 1, designated generally by the reference numeral 10 is a wrapping material constructed in accordance with the present invention for wrapping an item, the item herein being a floral grouping. One such floral grouping is shown in FIG. 5, and is generally designated by the numeral 12.

"Floral grouping" as used herein means cut fresh flowers, artificial flowers, other fresh and/or artificial plants or other floral materials and may include other secondary plants and/or other floral materials and may include other secondary plants and/or ornamentation which add to the aesthetics of the overall floral grouping 12. The term "floral grouping" as used herein also is intended to encompass a single flower or plant (real or artificial).

The floral grouping 12 comprises an upper end consisting of a bloom, foliage or flower portion 14 and a stem lower end consisting of a stem portion 16. However, it will be appreciated that the floral grouping 12 may consist of only a single bloom 14 or of only foliage (not shown).

Referring to FIGS. 1–2, the wrapping material 10 comprises a sheet of material 18. The sheet of material 18 comprises an upper surface 20, a lower surface 22, and an outer periphery 24. The outer periphery 24 of the sheet of material 18 comprises a first side 26, a second side 28, a third side 30, and a fourth side 32.

In the embodiments of FIGS. 1–15, the sheet of material 18 is square. It will be appreciated, however, that any shape or size of sheet 18 may be used to wrap a floral grouping 12 as long as it is sufficiently sized and shaped to wrap and encompass at least a portion of a floral grouping 12. For example, the sheet of material 18 may also comprise other shapes, i.e., rectangular, round, oval, octagonal, asymmetrical, or the like. Additionally the sheet of material 18 may be cut to represent a particular shape or figure, such as a heart shape. Multiple sheets of material 18 may also be used. Moreover, when multiple sheets of material 18 are used in combination, the sheets of material 18 need not be uniform in size or shape. Finally, it will be appreciated that each sheet of material 18 shown herein is substantially flat.

The sheet of material 18 may be constructed of a single sheet of material or a plurality of sheets. Any thickness of the sheet of material 18 may be utilized in accordance with the present invention as long as the sheet of material 18 may be wrapped about at least a portion of a floral grouping 12, as described below. The sheet of material 18 preferably has a thickness in a range of less than about 1 mil to about 30 mils. Typically the sheet of material 18 has a thickness in a range of less than about 0.2 mils to about 30 mils.

In one preferred embodiment, the sheet of material 18 is constructed from one sheet of man-made organic polymer film having a thickness in a range of from less than about 0.5 mils to about 2.5 mils. Additionally, an insulating material such as bubble film (not shown), preferably as one of two layers, can be utilized in order to provide needed protection for the item wrapped herein. Bubble film is well known in the art, and commercially available.

The sheet of material 18 is constructed from any suitable material that is capable of being wrapped about a floral grouping. Preferably the wrapping material 10 comprises paper (untreated or treated in any manner), cellophane, foil, man-made organic polymer film, fiber (woven or nonwoven or synthetic or natural), burlap, or combinations thereof.

The term "man-made organic polymer film" means a man-made resin such as a polypropylene as opposed to naturally occurring resins such as cellophane. A man-made organic polymer film is relatively strong and not as subject to tearing (substantially nontearable), as might be the case with paper or foil. The man-made organic polymer film is a substantially linearly linked processed organic polymer film and is a synthetic linear chain organic polymer where the carbon atoms are substantially linearly linked. Such films are synthetic polymers formed or synthesized from monomers. Further, a relatively substantially linearly linked processed organic polymer film is virtually waterproof which may be desirable in many applications such as wrapping a floral grouping.

Additionally, a relatively thin film of substantially linearly linked processed organic polymer does not substantially deteriorate in sunlight. Processed organic polymer film having carbon atoms both linearly linked and cross linked, and some cross linked polymer films, also may be suitable for use in the present invention provided such films are substantially flexible and can be made in a sheet-like format for wrapping purposes consistent with the present invention. For example, one such man-made organic polymer film is a polypropylene film.

The sheet of material 18 may vary in color. Further, the sheet of material 18 may consist of designs which are printed, etched, and/or embossed; in addition, the sheet of material 18 may have various colorings, coatings, flocking and/or metallic finishes, or be characterized totally or partially by pearlescent, translucent, transparent, iridescent, or the like, qualities. Each of the above-named characteristics may occur alone or in combination. Moreover, each surface of the sheet of material 18 may vary in the combination of such characteristics.

Each sheet of material 18 has a width 34 (FIG. 1) extending generally between the third and fourth sides 30 and 32, respectively, sufficiently sized whereby each sheet of material 18 can be wrapped about and encompass at least a portion of the floral grouping 12. Each sheet of material 18 has a length 36 (FIG. 1) extending generally between the first and second sides 26 and 28, respectively, sufficiently sized whereby the sheet of material 18 extends over a substantial portion of the floral grouping 12 when the sheet of material 18 has been wrapped about the floral grouping 12 in accordance with the present invention.

The present invention contemplates a plurality of sheets of material 18 connected together to form a pad 38 of sheets of material 18 as shown in FIGS. 3–12. The pad 38 comprises a plurality of sheets of material 18 stacked one on top of the other and positioned so that the periphery 24, that is, the first sides 26, the second sides 28, the third sides 30 and the fourth sides 32 of sheets of material 18 in the pad 38 generally are aligned.

Referring to FIGS. 2–6 and 8–10, the pad 38 further comprises a top sheet of material 40 and a next sheet of material 42 disposed thereunder, the other sheets of material 18 being disposed under the next sheet of material 42 in the pad 38 of sheets of material 18.

The top sheet of material 40 is capable of being disconnected from the pad 38 of sheets of material 18. When the top sheet of material 40 is disconnected, the next sheet of material 42 forms the new top sheet of material 40, and the sheet of material 18 lying under the new top sheet of material 40 forms a new next sheet of material 42.

An adhesive is affixed on the upper surface 20 of the sheet of material 18, as illustrated in FIGS. 1–4 and 13–15. The adhesive is unevenly affixed across the upper surface 20, so, for example, the amount of adhesive near the second side 28 of the sheet of material 18 is greater than the amount of adhesive near the first side 26 of the sheet of material 18 (FIG. 1), resulting in an unevenly affixed adhesive tack.

"Unevenly affixed adhesive tack" or words of similar import, as used herein, means that the deposition of adhesive tack is not uniform over a surface of a sheet of material 18; that is, different quantities of adhesive tack may be applied to different areas of a surface of a sheet of material 18, or different adhesives of varying adhesive tack properties may be applied to different areas of a surface of a sheet of material 18. The tack of adhesive varies over the surface of the sheet of material 18 so the tack is greater at one point on the surface of the sheet of material 18 as compared to the tack of the adhesive at another point on the surface of the sheet of material 18.

It is understood that, as the sheet of material 18 is changed in orientation, the uneven affixation of adhesive tack may extend between any two opposite sides of the sheet of material 18 (FIGS. 1 and 2). As shown in FIGS. 1–12, an adhesive is affixed in the form of a strip of adhesive having a varying width (FIGS. 1–12), in a series of evenly spaced spots of adhesive 44b or 44c, of varying size (FIGS. 13 and 14), or in a series of uniformly-sized spots of adhesive 44d with variation in the space between the spots of adhesive 44d (FIGS. 15). Additionally, the adhesive may also be affixed in a series of spots where the degree of adhesion varies from spot to spot as, for example, where different adhesive tacks are used (not shown), or where the adhesive is affixed in a continuous strip of constant width, but with the adhesive tack varying in the degree of adhesion from one end of the strip to the other (not shown).

The adhesive 44a affixed to the sheet of material 18 is in the form of a strip of adhesive 44a as shown in FIGS. 1–12. The strip of adhesive 44a extends generally between the first and second sides 26 and 28 of the sheet of material 18 and disposed near the fourth side 32 of the sheet of material 18. The strip of adhesive 44a has a first width 45 (FIG. 1) near the first side 26 of the sheet of material 18 and a second width 47 (FIG. 1) near the second side 28 of the sheet of material 18. The first width 45 is smaller than the second width 47 thereby providing an uneven adhesive tack with more tack near the second end 28 where there is more adhesive 44a and less tack near the first end 26 where there is less adhesive. In other words, the amount of adhesive 44a on the sheet of material 18 and thus the tack varies with the tack being greater near the second end 28 as compared to the tack of the adhesive 44 near the first end 26 of the sheet of material 18.

As shown in FIG. 1, the strip of adhesive 44a has a first end 50, a second end 52, a first side 54 and a second side 56. The first end 50 of the adhesive 44a is disposed near the first side 26 of the sheet of material 18, and the second end 52 of the adhesive 44a is disposed near the second side of the sheet of material 18. Additionally, the first side 54 of the adhesive 44a is disposed near the fourth side 32 of the sheet of material 18, and the second side 56 of the adhesive 44a is spaced a distance from the fourth side 36 of the sheet of material 18.

It should be noted that the strip of adhesive 44a may extend the full length of the material between the first and second sides 26 and 28 and may be disposed adjacent to the fourth side 32, rather than spaced a distance from the fourth side 32 as shown in FIGS. 1 through 12.

The strip of adhesive 44a is trapezoidally shaped. The first width 45 of the adhesive 44a is disposed near the first end 50 of the adhesive 44a and the second width 47 is disposed adjacent to the second end 52 of the adhesive 44a. The amount of adhesive 44a on the sheet of material 18 varies from the first end 50 to the second end 52 of the adhesive 44a with more adhesive being disposed near the second end 52 of the adhesive 44a as compared to the amount of adhesive disposed on the sheet of material 18 near the first end 50 of the adhesive 44a. Thus, as mentioned before, the tack of the adhesive varies from the first end 50 to the second end 52 of the adhesive 44a, with the tack being greater near the second end 52 as compared to the tack of adhesive 44a near the first end 50 of the adhesive 44a.

Shown in FIG. 13 is a modified sheet of material 18b which is constructed exactly like the sheet of material 18 described in detail before, except the sheet of material 18b includes a modified adhesive 44b applied thereto. More Particularly, the adhesive 44b is applied to the sheet of material 18b in the form of spaced apart spots of adhesive 44b with each of the spots of adhesive 44b being elliptical or circularly shaped. The spots of adhesive 44b are spaced apart along the fourth side 32b of the sheet of material 18b with the spot of adhesive 44b generally adjacent to the second end 52b being larger than the spot adjacent to the first end 50b of the adhesive 44b. Again, more adhesive is included in the spot of adhesive 44b near the second end 52b of the adhesive 44b as compared to the amount of adhesive included in the spot of adhesive 44b adjacent to the end 50b of the adhesive 44b. The adhesive 44b will thus have more tack at the second end 52b of the adhesive 44b as compared to the first end 50b of the adhesive 44b with the tack decreasing from the second end 52b to the first end 50b of the adhesive 44b.

Figure 14:
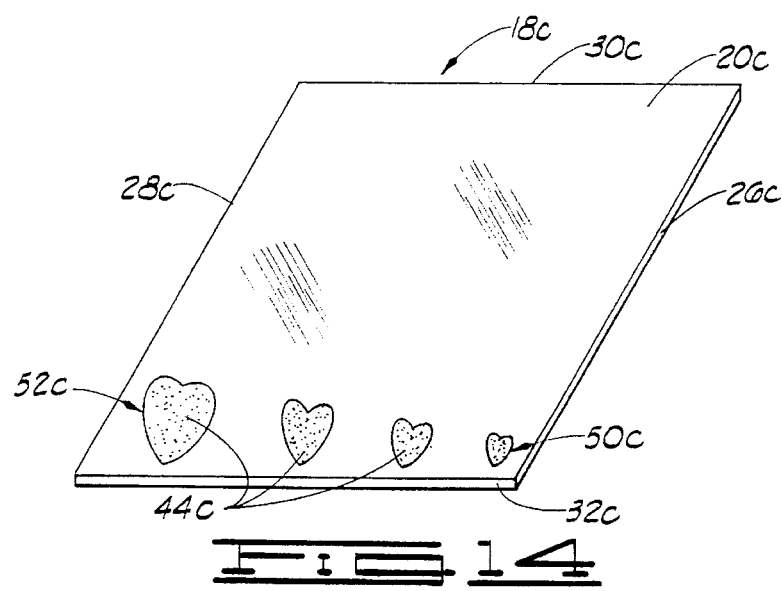
FIG. 14 is a perspective view of another modified sheet of material similar to the sheet of material shown in FIG. 2, except that the adhesive is shown in a series of evenly spaced heart-shaped spots of variable size.
Figure 15:
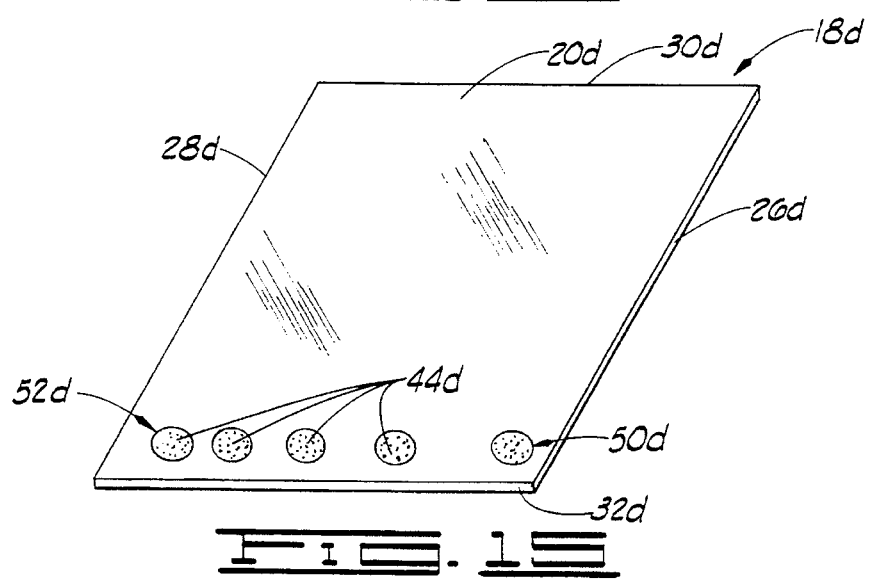
FIG. 15 is a perspective view of still another modified sheet of material similar to the sheet of material shown FIG. 2, except that the adhesive is shown in a series of uniformly-sized spots, with varying distance between the spots.

The modified sheet of material 18c shown in FIG. 14 is constructed exactly like the sheet of material 18 described in detail before, except the adhesive 44c is applied to the sheet of material 18c in the form of heart-shaped spots with the size of the heart-shaped spots of adhesive 44c varying in size from the second end 52c to the first end 50c of the adhesive 44c in a manner like that described before with respect to the spots of adhesive 44b shown in FIG. 13.

Shown in FIG. 15 is a sheet of material 18d constructed exactly like the sheet of material 18 described in detail before, except the adhesive 44d is applied to the sheet of material 18b in the form of spots of adhesive 44d where the spots are uniformly sized (the same diameter), but the distance between the spots varies and the distance becomes greater toward the first end 50d of the adhesive 44d. Thus, the amount of adhesive 44d on the sheet of material 18d is greater at the second end 52d of the adhesive 44d as compared to the amount of adhesive on the sheet of material 18d near the first end 50d of the adhesive 44d. Thus, the tack of the adhesive 44d will be greater near the second end 52d of the adhesive 44d as compared to the tack of the adhesive near the first end 50d of the adhesive 44d because the amount of adhesive on the sheet of material 18d is greater near the second end 52d of the adhesive 44d as compared to the amount of adhesive on the sheet of material 18d near the first end 50d of the adhesive 44d.

The spots of adhesive 44b (FIG. 13) may comprise any geometric form, such as squares, parallelograms, triangles, rectangles, octagonals, or the like, with circle shapes being shown only by way of example. Spots of adhesive 44c may also comprise nongeometric or fanciful forms, such as the hearts (FIG. 14), or flowers, lace, slogans, logos, and the like. The adhesive may be affixed to the surface of the sheet of material by spraying it thereupon, painting it thereupon, rolling it thereupon, or by any other method known to the art which would dispose the adhesive thereupon.

Ink, dye, pigment, or any combination thereof of any color, or combination of colors can be mixed with the adhesive, to create a colored adhesive. Spots of colored adhesive may provide all, or part of, the surface decoration of the sheet of material.

The adhesive used in strips and spots of adhesive defined herein may be any one or more of those where the adhesive permits an adhesive connection and releasable connection between sheets of material 18. Such adhesives are known in the art and commercially available.

The adhesive imparts sufficient adhesion to permit the sheet of material 18 to be wrapped around a floral grouping 12, with the upper surface 20 of the sheet of material 18 disposed adjacent to the floral grouping (FIGS. 7 and 12). The variably affixed strips 44a of adhesive or spots of adhesive 44b, 44c or 44d on the upper surface 20 adhesively contact another portion of the sheet of material 18 for adhesively connecting the sheet of material 18 to itself, after the sheet of material 18 is wrapped about at least a portion of a floral grouping 12. Additionally, the adhesive 44a or 44b or 44c or 44d may adhere to the stem portion 16, of a floral grouping 12, causing the floral grouping 12 to be affixed securely within the sheet of material 18 (FIGS. 10–12).

Referring to FIGS. 3–12, the variable affixation of adhesive 44a on each sheet of material 18 adhesively and releasably connects each sheet of material 18 to one other sheet of material 18 to form the pad 38 whereby one of the sheets of material 18 can be releasably disconnected from another sheet of material 18 by pulling the sheets of material 18 apart. At the same time, the variable affixation of adhesive 44a or 44b or 44c or 44d increases the ease and convenience with which a sheet of material 18 may be released from the pad 38, by providing less resistance to the force required to remove the sheet of material 18 from the pad 38 when a corner of the sheet of material 18 at the junction of the first side 26 and the fourth side 32, or in another embodiment, at the junction of the second side 28 and the fourth side 32 is pulled away from the pad 38 by an operator (FIGS. 8 and 12). In these embodiments, the sheet of material 18 is pulled apart and away from the pad 38 at an area where there is a lesser amount of adhesive 44a or 44b or 44c or 44d, thereby requiring less releasing force and, as a result, reducing the possibility that the floral grouping 12 may be damaged as a result of the operator having to take a firm grip on the sheet of material 18 and the enclosed floral grouping 12 in order to obtain the leverage necessary to pull the sheet of material 18 and the enclosed floral grouping 12 away from the pad 38 (FIGS. 7, 8, 11 and 12).

In a general method of use for the embodiments illustrated in FIGS. 2–7, a plurality of sheets of material 18, and a floral grouping 12, as previously described, are provided.

The floral grouping 12 is placed on a sheet of material 18 in the pad 38, and the sheet of material 18 is wrapped about the floral grouping 12. The sheet of material 18 simultaneously is disconnected from the pad 38 of sheets of material 18 as the sheet 18 is wrapped about the floral grouping 12.

The third side 30 of the sheet of material 18 overlaps other portions of the sheet of material 18. The overlapping portions of the sheet of material 18 are bonded to the sheet of material 18 by their contact with the strip of adhesive 44a on the upper surface 20 which adhesively bonds to the overlapping portions of the sheet of material 18, whereby a side of the sheet of material 18 is bonded to overlapping portions of the sheet of material 18 generally between other sides of the sheet of material 18 whereby there are no loose flaps formed by unbonded portions of the first side 26 of the sheet of material 18.

The sheet of material 18 substantially encompasses and surrounds a substantial portion of the flower portion 14 of the floral grouping 12 and a substantial portion of the stem portion 16 of the floral grouping 12. The sheet of material 18 is held about the floral grouping 12 by the bonding of the overlapping portions of the sheet of material 18, the sheet of material 18 being wrapped about the stem portion 16 of the floral grouping 12.

The sheet of material 18 may also be affixed to the stem portion 16 of the floral grouping 12 by adhesion of the stem portion 16 to the adhesive 44a. The sheet of material 18 wrapped about the floral grouping 12 forms a shaped wrapping, the shape being selected from the group consisting of conical and cylindrical, such shaped wrapping having an opening extending through a lower end thereof and an opening extending through the upper end thereof with the stem portion 16 of the floral grouping 12 extending through the opening in the lower end and the flower portion 14 of the floral grouping 12 being exposed near the opening in the upper end thereof, the upper end of the wrapping being loosely wrapped about the flower portion 14 of the floral grouping 12.

FIGS. 5–8 show one specific method of use. A plurality of sheets of material 18 in a pad 38, and a floral grouping 12, as described above, are provided. The floral grouping 12 is placed on a portion of the top sheet 40 of the pad of material 38, generally diagonally across the top sheet of material 40, with the bloom, foliage, or flower portion 14 near the junction of the first side 26 and the third side 30, and with the stem portion 16 extending near the junction of the second side 28 and the fourth side 32 (FIG. 5).

An operator then lifts a portion of the top sheet of material 40 generally near the junction of the third side 30 and the second side 28 and places the lifted portion of the top sheet of material 40 generally about a portion of the floral grouping 12, as shown in FIG. 6. In this position, the top sheet of material 40 and the floral grouping 12 are rolled in a general direction 58 (FIG. 7) thereby rolling the top sheet of material 40 generally about the floral grouping 12. The top sheet of material 40 and the floral grouping 12 are continued to be rolled in a direction 60 and in the direction 58 generally toward the junction of the first side 26 and the fourth side 32 of the top sheet of material 40 until the floral grouping 12 is encompassed generally by the top sheet of material 40.

In this position, the operator continues to roll the top sheet of material 40 and the floral grouping 12 disposed thereon in the direction 60 and in the direction 58 thereby lifting the top sheet of material 40 from the varying strip of adhesive 44a on the upper surface 20 of the next sheet of material 42 disposed generally beneath the top sheet of material 40 and the next sheet of material 42 disposed under the top sheet of material 40. As the floral grouping 12 and the top sheet of material 40 are rolled over the varying strip of adhesive 44a on the upper surface 20 of the top sheet of material 40, the varying strip of adhesive tack adhesively connects to an adjacent portion of the top sheet of material 40 thereby securing the top sheet of material 40 and generally securing the sheet of material about the floral grouping 12, as shown in FIG. 8.

When the top sheet of material 40 has been secured about the floral grouping 12 in the manner just described, the next sheet of material 42, generally under the top sheet of material 40, then provides a new top sheet of material, and the process can be repeated for wrapping additional or other floral groupings 12.

FIGS. 9–12 show an additional specific method of use. A plurality of sheets of material 18 in a pad 38, and a floral grouping 12, as described above, are provided. The floral grouping 12 is placed on a portion of the top sheet 40 of the pad of material 38, generally parallel to the second side 28 of the sheet of material 18, and with the bloom, foliage, or flower portion 14 near the junction of the second side 28 and the third side 30, and with the stem portion 16 extending near the junction of the fourth side 32 and the second side 28 (FIG. 9).

An operator then lifts a portion of the top sheet of material 40 generally along the third side 30 and places the lifted portion of the top sheet of material 40 generally about a portion of the floral grouping 12, as shown in FIG. 10. In this position, the top sheet of material 40 and the floral grouping 12 are rolled in a general direction 62 (FIG. 11) thereby rolling the top sheet of material 40 generally about the floral grouping 12. The top sheet of material 40 and the floral grouping 12 are continued to be rolled in the direction 62 and in a direction 64 generally toward the first side 26 of the top sheet of material 40 until the floral grouping 12 is encompassed generally by the top sheet of material 40, as shown in FIG. 11. In this position, the operator continues to roll the top sheet of material 40 and the floral grouping 12 disposed thereon in the direction 64 and in the direction 62 thereby lifting the top sheet of material 40 from the varying strip of adhesive 44a on the upper surface 20 of the next sheet of material 42 disposed generally beneath the top sheet of material 40.

As the floral grouping 12 and the top sheet of material 40 are rolled over the varying strip of adhesive 44a on the upper surface 20 of the top sheet of material 40, the varying strip of adhesive 44a adhesively connects to an adjacent portion of the top sheet of material 40 thereby securing the top sheet of material 40 and generally securing the sheet of material about the floral grouping 12, as shown in FIG. 12.

The sheets of material 18b, 18c, and 18d (FIGS. 13–15) are wrapped about the floral grouping 12 in a manner exactly like that described before with respect to the sheet of material 18.

Changes may be made in the embodiments of the invention described herein or in parts or elements of the embodiments described herein or in the steps or in the sequence of steps of the methods described herein without departing from the spirit and scope of the invention as defined in the following claims.

What is claimed is:

1. A wrapping material for wrapping a floral grouping, comprising:

a plurality of sheets of material, each sheet of material having an upper surface, a lower surface, and an outer periphery, with each sheet of material having an adhesive disposed upon at least a portion of the upper surface of the sheet of material, the adhesive having portions of varying tack, the adhesive disposed upon each sheet of material such that at least one portion of the adhesive has a lesser tack while at least one other portion of the adhesive has a greater tack, the portion of the adhesive having a lesser tack having a greater releasability and the portion of the adhesive having a greater tack having a lesser releasability, the plurality of sheets of material connected together via the adhesive disposed thereon and the plurality of sheets of material cooperating to form the pad of sheets of material and wherein when a floral grouping, is placed upon one of the sheets of material in the pad and said sheet of material is wrapped about the floral grouping, the sheet of material becomes progressively easier to release from the next sheet below said sheet as the sheet of material is advancingly rolled in a direction from the portion of the adhesive having a greater tack and having a lesser releasability to the portion of the adhesive having a lesser tack and having a greater releasability.

2. The wrapping material of claim 1 wherein the sheet of material is defined further as being wrappable about a floral grouping with a portion of the sheet of material with the adhesive thereon being folded over the floral grouping so that the portion of the sheet of material with the adhesive thereon overlaps another portion of the sheet of material and the overlapping portions are adhesively connected.

3. The wrapping material of claim 1 wherein the sheet of material is defined further as being wrappable about a floral grouping, surrounding and encompassing a substantial portion of the stem portion of the floral grouping and being held about the floral grouping by the bonding of the overlapped portions of the sheet of material, the sheet of material wrappable about the floral grouping for forming a shaped wrapping, the shape being selected from the group consisting of conical shapes and cylindrical shapes, the shaped wrapping having an opening extending through a lower end thereof and an opening extending through an upper end thereof with the flower portion of the floral grouping extending through the upper end thereof with the stem portion of the floral grouping extending through the opening in the lower end and the flower end of the floral grouping being exposed near the opening in the upper end thereof.

4. The wrapping material of claim 1 wherein the adhesive is disposed in a continuous strip of adhesive having a variable width, the strip of adhesive having a first width near the first end of the adhesive and a second width near the second end of the adhesive, the second width being greater than the first width/whereby a greater amount of adhesive is disposed on the sheet of material near the second end of the adhesive as compared to the amount of the adhesive disposed on the sheet of material near the first end of the adhesive.

5. The wrapping material of claim 4 wherein the strip of adhesive is defined further as having a trapezoidal shape.

6. The wrapping material of claim 1 wherein the adhesive is disposed on the sheet of material in a series of evenly spaced spots of adhesive where the spots of adhesive have varying size.

7. The wrapping material of claim 6 wherein the spot of adhesive disposed on the sheet of material near the second end of the adhesive is larger than the spot of adhesive disposed on the sheet of material near the first end of the adhesive.

8. The wrapping material of claim 1 wherein the adhesive is disposed on the sheet of material in a series of spots of adhesive with each spot of adhesive having about the same size as the other spots of adhesive and with the distance between adjacent spots of adhesive varying between the first and the second end of the adhesive, the distance between adjacent spots of adhesive being larger near the first end of the adhesive as compared to the distance between adjacent spots of adhesive near the second end of the adhesive.

9. The wrapping material of claim 1 wherein the adhesive is disposed on the sheet of material in a series of substantially uniformly sized and spaced spots of adhesive and where the tack varies from spot to spot, with the tack of the spot of adhesive being greater near the second end of the adhesive as compared to the tack of the spot of adhesive near the first end of the adhesive.

10. The wrapping material of claim 1 wherein the sheet of material is defined further as comprising a first side, a second side, a third side and a fourth side, and wherein the adhesive is defined further as being disposed on the upper surface of each sheet of material near the fourth side of the sheet of material and extending a distance between the first and the second sides of the sheet of material.

11. The wrapping material of claim 1 wherein the sheet of material is defined further as comprising a first side, a second side, a third side and a fourth side, and wherein the adhesive is defined further as being disposed on the upper surface of the sheets of material near the third side of the sheet of material and extending a distance between the first and second sides of the sheet of material.

12. The wrapping material of claim 1 wherein each sheet of material is constructed from material selected from the group of materials consisting of paper (treated or untreated), cellophane, foil, manmade organic polymer film, fiber (woven or nonwoven or natural or synthetic), burlap, or combinations thereof.

13. The wrapping material of claim 1 wherein each sheet of material has a thickness in a range from less than about 1 mil to about 30 mils.

* * * * *

UNITED STATES PATENT AND TRADEMARK OFFICE
CERTIFICATE OF CORRECTION

PATENT NO. : 5,526,933
DATED : June 18, 1996
INVENTOR(S) : Donald E. Weder It is certified that error appears in the above-identified patent and that said Letters Patent is hereby corrected as shown below:

Column 4, line 28, please delete "FIGS. 2-6 and 8-10" and substitute therefor --FIGS. 3-12--.

Column 5, line 23, please delete "adhesive 44" and substitute therefor --adhesive 44a--.

Column 5, line 29, after "second side" please insert --28--.

Column 5, line 33, please delete "fourth side 36" and substitute therefor --fourth side 32--.

Column 6, lines 18-19, please delete "sheet of material 18b" and substitute therefor --sheet of material 18d--.

Column 9, line 43, after "floral grouping" please delete ",".

Signed and Sealed this

Twelfth Day of November, 1996

Attest:

BRUCE LEHMAN

*Attesting Officer*   *Commissioner of Patents and Trademarks*